Jan. 7, 1936.　　　　J. J. VANHORN　　　　2,027,251
SIGNALING APPARATUS
Filed Aug. 10, 1933

INVENTOR
James J. Vanhorn
BY
HIS ATTORNEY

Patented Jan. 7, 1936

2,027,251

UNITED STATES PATENT OFFICE 2,027,251

SIGNALING APPARATUS

James J. Vanhorn, Pittsburgh, Pa., assignor to The Union Switch & Signal Company, Swissvale, Pa., a corporation of Pennsylvania Application August 10, 1933, Serial No. 684,515

8 Claims. (Cl. 246—124)

My invention relates to signaling apparatus, and has for an object the provision of novel and improved means for indicating at a remote point, such, for example, as a despatcher's office, the traffic conditions existing in two sections of a railway track. A further object of my invention is to accomplish this result by using a minimum number of line wires between the track and the despatcher's office.

I will describe two forms of apparatus embodying my invention, and will then point out the novel features thereof in claims.

Figure 1:
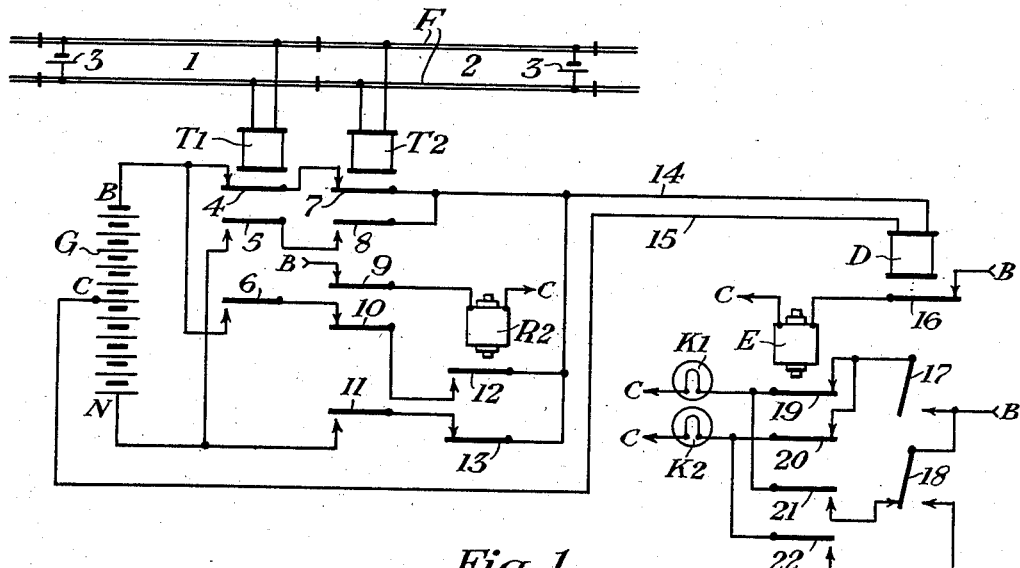
Figure 2:
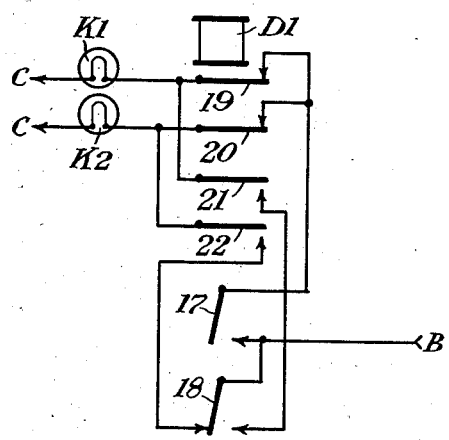

In the accompanying drawing, Fig. 1 is a diagrammatic view showing one form of apparatus embodying my invention. Fig. 2 is a view showing a modification of a portion of the apparatus shown in Fig. 1 and also embodying my invention.

Similar reference characters refer to similar parts in each of the views.

Referring first to Fig. 1, the reference character F designates the track rails of a stretch of railway track, which rails are divided to form two sections 1 and 2. Section 1 is provided with a track circuit comprising a battery 3 and a track relay T1, while section 2 is provided with a similar track circuit comprising a battery 3 and a track relay T2. Associated with the relay T2 is a repeater relay R2, having slow releasing and slow pick-up characteristics. Relay R2 is provided with a circuit which includes a front contact 9 of track relay T2 and a source of current the terminals of which are designated B and C.

Located at a point remote from the track sections 1 and 2, such, for example, as in a despatcher's office, are two indicator lamps K1 and K2 corresponding respectively to track sections 1 and 2. These lamps are controlled by a polar relay D, and a repeater relay E having slow pick-up and slow releasing characteristics. The polar relay D is provided with a line circuit comprising wires 14 and 15. Wire 15 is constantly connected with the mid point C of a battery G, which is located adjacent the track sections 1 and 2. Means are provided for at times connecting the line wire 14 with the positive terminal B or the negative terminal N of the battery G according to the conditions of traffic in the sections 1 and 2.

As shown in the drawing, both sections 1 and 2 are unoccupied, and under this condition relay D is supplied with current of normal polarity by virtue of a circuit which passes from terminal B of battery G, through front contact 4 of track relay T1, front contact 7 of track relay T2, line wire 14, winding of relay D, and line wire 15 to the mid point C of battery G. Relay E is then energized by virtue of a circuit which includes a front neutral contact 16 of relay D and a source of current the terminals of which are designated B and C. The circuits for both indicator lamps K1 and K2 are then open, so that these lamps are both extinguished.

I will now assume that a train enters section 1, thereby deenergizing track relay T1. This will disconnect wire 14 from the battery G, thereby deenergizing relay D and so in turn deenergizing relay E. When relay E releases, indicator lamp K1 will become energized by virtue of a circuit which passes from terminal B, through polar contact 18 of relay D in the normal position, back contact 21 of relay E, and the lamp K1 to terminal C. Lamp K1 will therefore become lighted to indicate that section 1 is occupied.

When the forward end of the train enters section 2, it will deenergize track relay T2, and during the period of time in which both track relays T1 and T2 are deenergized relay D will become energized by current of reverse polarity, the circuit being from terminal N of battery G, through back contact 5 of relay T1, back contact 8 of relay T2, wire 14, winding of relay D, and wire 15 to terminal C of battery G. When contact 16 of relay D closes, it will cause relay E to become energized, whereupon lamp K1 will become energized by a new circuit which passes from terminal B, through polar contact 17 in the reverse position, front contact 19 of relay E, and lamp K1 to terminal C. The lamp K2 will also become energized by a circuit which includes polar contact 17 in the reverse position and front contact 20 of relay E. Lamps K1 and K2 will therefore both be lighted to indicate that both sections 1 and 2 are occupied.

The deenergization of track relay T2 has caused relay R2 to become deenergized. When the rear end of the train leaves section 1, track relay T1 will become energized, thereby opening at back contact 5 the reverse circuit for relay D, so that the latter relay will then become deenergized with its polar armature left in the reverse position. Relay E will then become deenergized, thereby opening at contact 19 the circuit just traced for lamp K1. The circuit also just traced for lamp K2 will be opened at contact 20, but another circuit for this lamp will be closed through polar contact 18 in the reverse position on back contact 22. Lamp K1 will then be extinguished, but lamp K2 will be lighted to indicate that section 2 is occupied.

When the train passes out of section 2, the original circuit for relay D will be closed, so that the parts will be restored to the conditions in which they are shown in the drawing.

I will now assume that a train moving toward the left enters section 2. This will deenergize track relay T2, thereby deenergizing relay R2, but during the short interval of time between the release of relay T2 and the release of relay R2, line wire 14 will be connected with terminal N of battery G, through back contact 11 of relay T2 and front contact 13 of relay R2, so that relay D will be momentarily energized in the reverse direction. When relay R2 releases, relay D will become deenergized with its polar armature left in the reverse position. When relay E releases, lamp K2 will become lighted through back contact 22 and polar contact 18 in the reverse position, thereby indicating the occupancy of section 2.

When the forward end of the train enters section 1, it will deenergize track relay T1, whereupon both indicator lamps K1 and K2 will become lighted by virtue of the fact that relay D is energized in its reverse direction.

When the rear end of the train passes out of section 2, relay T2, and therefore R2, will become energized, but during the short interval of time between the picking up of relay T2 and the picking up of relay R2, line wire 14 will be momentarily connected with terminal B of the battery G through back contact 6 of relay T1, front contact 10 of relay T2, and back contact 12 of relay R2. Relay D will therefore be momentarily energized in the normal direction and will become deenergized as soon as contact 12 of relay R2 opens. Lamp K2 will therefore become extinguished, but lamp K1 will remain lighted because its circuit will be closed through back contact 21 and polar contact 18 in the normal position.

When the train passes out of section 1, the parts will be restored to the conditions in which they are shown in the drawing.

Relay D is assumed to be a polar relay of such type that its neutral armature releases momentarily during reversal of the polarity of the current supplied to the relay winding, but the polar armature of which remains in the position it last occupied when the relay becomes deenergized. The purpose of the repeater relay E is to bridge the short interval of time during which the neutral armature of relay D is open in response to reversal of the polarity of the current supplied to relay D. In Fig. 2, I have illustrated a modification of the control circuits for lamps K1 and K2, which modification may be used if the polar relay, which is here designated D1, is of such character that its neutral armature does not release during reversal of the polarity of the current supplied to the relay winding. A relay of this type is disclosed and claimed in Letters Patent of the United States No. 1,852,210, granted to F. C. Larson on April 5, 1932. The circuits for the indicator lamps in Fig. 2 are the same as those shown in Fig. 1, except that the contacts 19, 20, 21 and 22 are neutral contacts of the polar relay D1 instead of being associated with a repeater relay as in Fig. 1. The operation of the apparatus when modified in accordance with Fig. 2, is the same as the operation hereinbefore described of the apparatus shown in Fig. 1.

Although I have herein shown and described only two forms of apparatus embodying my invention, it is understood that various changes and modifications may be made therein within the scope of the appended claims without departing from the spirit and scope of my invention.

Having thus described my invention, what I claim is:

1. In combination, two sections of railway track, a polar relay provided with a line circuit comprising two wires, means operating when both of said sections are unoccupied to supply said line circuit with current of normal polarity, means operating as long as both of said sections are occupied to continuously supply said line circuit with current of reverse polarity, means operating when a train enters the first section while the second section is unoccupied to discontinue the supply of current to said line circuit, means operating when a train enters the second section while the first section is unoccupied to momentarily supply current of reverse polarity to said line circuit and to thereafter discontinue the supply of current to the line circuit, and indicating means for said sections controlled by said relay.

2. In combination, two sections of railway track, a polar relay provided with a line circuit comprising two wires, means operating when both of said sections are unoccupied to supply said line circuit with current of normal polarity, means operating as long as both of said sections are occupied to continuously supply said line circuit with current of reverse polarity, means operating when a train enters the first section while the second section is unoccupied to discontinue the supply of current to said line circuit, means operating when a train enters the second section while the first section is unoccupied to momentarily supply current of reverse polarity to said line circuit and to thereafter discontinue the supply of current to the line circuit, two indicators one for each of said sections, means for energizing both of said indicators when said polar relay is energized with current of reverse polarity, means operating to energize the first indicator but not the second when said relay becomes deenergized after having been energized by current of normal polarity, and means operating to energize the second indicator but not the first when said relay becomes deenergized after having been energized by current of reverse polarity.

3. In combination, two sections of railway track, a polar relay provided with a line circuit comprising two wires, means operating when both of said sections are unoccupied to supply said line circuit with current of normal polarity, means operating when both of said sections are occupied to supply said line circuit with current of reverse polarity, means operating when a train enters the first section while the second section is unoccupied to discontinue the supply of current to said line circuit, means operating when a train enters the second section while the first section is unoccupied to momentarily supply current of reverse polarity to said line circuit and to thereafter discontinue the supply of current to the line circuit, a slow releasing relay controlled by a front neutral contact of said polar relay, two indicators one for each of said track sections, a circuit for said first indicator including a front contact of said slow releasing relay and a reverse polar contact of said polar relay, a second circuit for said first indicator including a back contact of said slow releasing relay and a normal polar contact of said polar relay, a circuit for said second indicator including a front contact of said slow releasing relay and a reverse polar contact of said polar relay and a second circuit for said second indicator including a back contact of said slow releasing relay and a reverse polar contact of said polar relay.

4. In combination, two sections of railway track, a track circuit including a track relay for each section, a slow acting repeater relay controlled by a front contact of the second track relay, two line wires 14 and 15, a source of current a mid point of which is connected with wire 15, means for connecting wire 14 with one terminal of said source through a front contact of each track relay in series or through a back contact of the first track relay and a front contact of the second track relay and a back contact of said repeater relay all in series, means for connecting wire 14 with the other terminal of said source through back contacts of said two track relays in series or through a back contact of said second track relay and a front contact of said slow acting relay in series, a polar relay connected with said line wires, and indicating means for said sections controlled by said polar relay.

5. In combination, two sections of railway track, a track circuit including a track relay for each section, a slow acting repeater relay controlled by a front contact of the second track relay, two line wires 14 and 15, a source of current a mid point of which is connected with wire 15, means for connecting wire 14 with one terminal of said source through a front contact of each track relay in series or through a back contact of the first track relay and a front contact of the second track relay and a back contact of said repeater relay all in series, means for connecting wire 14 with the other terminal of said source through back contacts of said two track relays in series or through a back contact of said second track relay and a front contact of said slow acting relay in series, a polar relay connected with said line wires, two indicators one for each of said sections, means for energizing both of said indicators when said polar relay is energized with current of reverse polarity, means operating to energize the first indicator but not the second when said relay becomes deenergized after having been energized by current of normal polarity, and means operating to energize the second indicator but not the first when said relay becomes deenergized after having been energized by current of reverse polarity.

6. In combination, two sections of railway track, a polar relay provided with a line circuit comprising two wires, means operating when both of said sections are unoccupied to supply said line circuit with current of normal polarity, means operating when both of said sections are occupied to supply said line circuit with current of reverse polarity, means operating when a train enters the first section while the second section is unoccupied to discontinue the supply of current to said line circuit, means operating when a train enters the second section while the first section is unoccupied to momentarily supply current of reverse polarity to said line circuit and to thereafter discontinue the supply of current to the line circuit, means operating when a train moving from the second section into the first section clears the second section to momentarily supply current of normal polarity to said line circuit and to thereafter discontinue the supply of current to the line circuit, and indication means for said sections controlled by said polar relay.

7. In combination, two sections of railway track, a polar relay provided with a line circuit comprising two wires, means operating when both of said sections are unoccupied to supply said line circuit with current of normal polarity, means operating when both of said sections are occupied to supply said line circuit with current of reverse polarity, means operating when a train enters the first section while the second section is unoccupied to discontinue the supply of current to said line circuit, means operating when a train enters the second section while the first section is unoccupied to momentarily supply current of reverse polarity to said line circuit and to thereafter discontinue the supply of current to the line circuit, means operating when a train moving from the second section into the first section clears the second section to momentarily supply current of normal polarity to said line circuit and to thereafter discontinue the supply of current to the line circuit, two indicators one for each of said sections, means for energizing both of said indicators when said polar relay is energized with current of reverse polarity, means operating to energize the first indicator but not the second when said relay becomes deenergized after having been energized by current of normal polarity, and means operating to energize the second indicator but not the first when said relay becomes deenergized after having been energized by current of reverse polarity.

8. In combination, two sections of railway track, a polar relay, means operating when both of said sections are unoccupied to supply said polar relay with current of normal polarity, means operating as long as both of said sections are occupied to continuously supply said polar relay with current of reverse polarity, means operating when a train enters the first section while the second section is unoccupied to discontinue the supply of current to said polar relay, means operating when a train enters the second section while the first section is unoccupied to momentarily supply current of reverse polarity to said polar relay and to thereafter discontinue the supply of current to said relay, and indicating means for said sections controlled by said relay.

JAMES J. VANHORN.